United States Patent [19]

DeRaymond

[11] Patent Number: 4,893,843
[45] Date of Patent: Jan. 16, 1990

[54] LUBRICANT-FREE ELASTOMERIC GASKET

[75] Inventor: Peter G. DeRaymond, Nazareth, Pa.

[73] Assignee: Victaulic Company of America, Easton, Pa.

[21] Appl. No.: 322,789

[22] Filed: Mar. 13, 1989

[51] Int. Cl.$^4$ .............................................. F16L 21/06
[52] U.S. Cl. ..................................... 285/112; 285/373; 277/206 R
[58] Field of Search ...................... 285/112, 373, 369; 277/206 R

[56] References Cited

U.S. PATENT DOCUMENTS

| | | | |
|---|---|---|---|
| 875,729 | 1/1908 | O'Brien | 285/373 |
| 2,913,262 | 11/1959 | DeCenzo et al. | 285/373 |
| 3,664,691 | 5/1972 | Nakamura | 285/112 |
| 4,391,458 | 7/1983 | Blakeley | 285/112 |
| 4,471,979 | 9/1984 | Gibb et al. | 285/373 |
| 4,678,208 | 7/1987 | DeRaymond | 285/112 |

FOREIGN PATENT DOCUMENTS

| | | | |
|---|---|---|---|
| 740433 | 11/1955 | United Kingdom . | |
| 2182992 | 5/1987 | United Kingdom | 285/373 |

*Primary Examiner*—Randolph A. Reese
*Assistant Examiner*—Anthony Knight
*Attorney, Agent, or Firm*—Abelman Frayne Rezac & Schwab

[57] ABSTRACT

A gasket for use in a segmented pipe coupling has portions at its ends of greater radius than the radius of the portion intermediate the ends, thus enabling the pipe coupling to be applied to a pipe in the absence of lubricants.

21 Claims, 5 Drawing Sheets

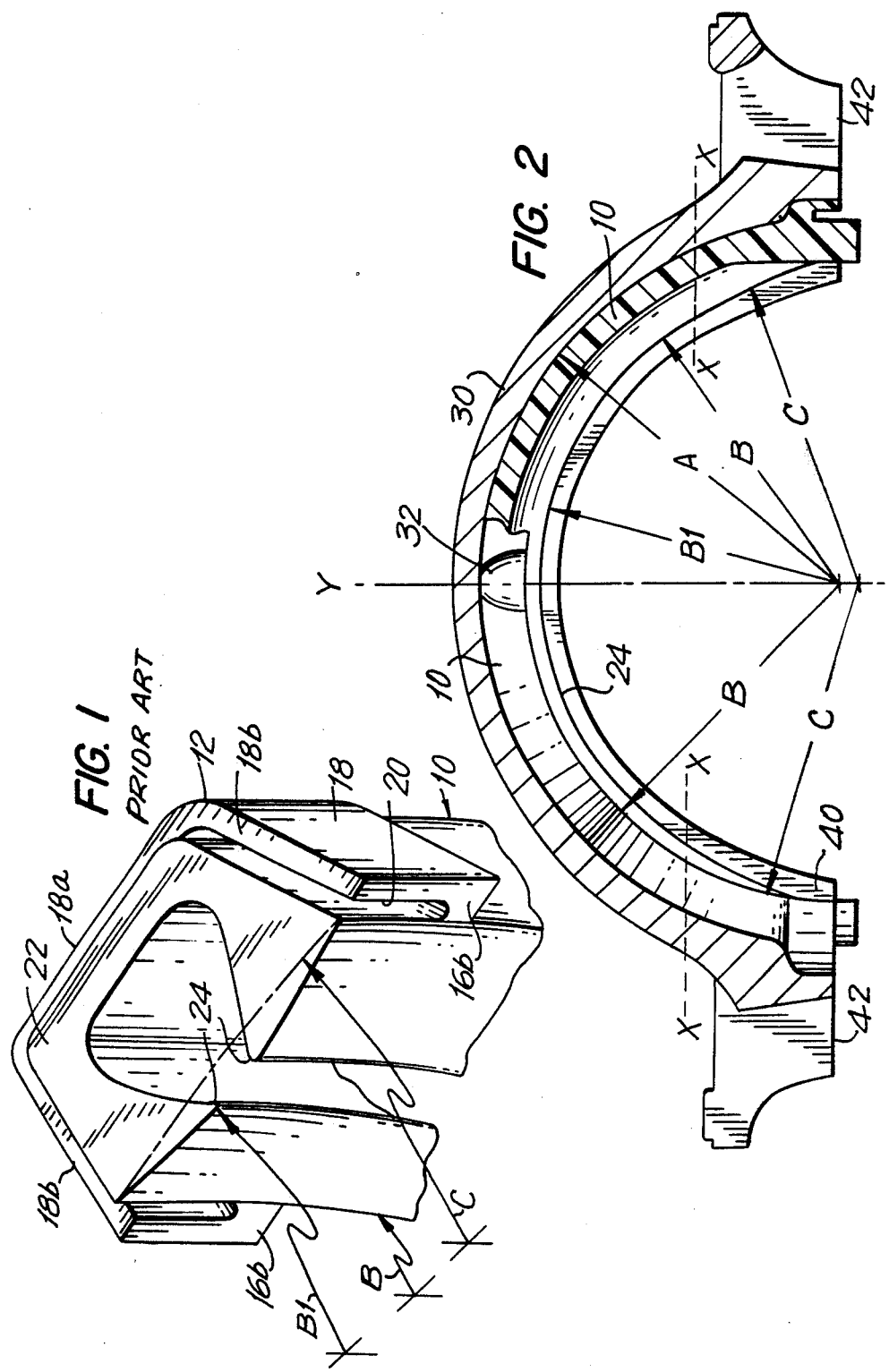

LUBRICANT-FREE ELASTOMERIC GASKET

FIELD OF THE INVENTION

This invention relates to an elastomeric gasket for use in a segmented pipe coupling, and particularly relates to an elastomeric gasket that does not require lubrication prior to the assembly of a segmented pipe coupling onto a pipe.

The elastomeric gasket can either be a split gasket adapted to encircle a pipe, or, it can be a gasket segment for use in conjunction with one or more identical such coupling segments

BACKGROUND OF THE INVENTION

A split gasket is one that is of a circumferential dimension sufficient for it to completely encircle a pipe, the entire gasket having only two ends which are brought into compressive relation with each other upon tightening down of the segmented pipe coupling.

Gasket segments more usually are equal in number to the number of coupling segments, usually two, each of which has two ends for compressive engagement by a corresponding end of a juxtaposed gasket segment. Segmented pipe couplings are well known in the art, and are employed either for connecting the adjacent ends of a pair of pipes to each other in sealed relationship, or, for connecting the end of a single pipe to some other structure in sealed relationship.

In the former instance, the segmented pipe coupling incorporates g single split gasket, or plural gasket segments formed from an elastomeric material and which are received within the respective coupling segments. The gasket or the respective gasket segments are provided with dual sealing lips for engagement with the outer periphery of the respective pipes.

In the latter instance, the respective segments each include a radial flange for attachment to the said other structure, the gasket or gasket segments providing the required seal at the interface of the flange and the other structure, and also providing a sealing lip for engagement with the outer periphery of the pipe.

It has been prior proposed in De Raymond U.S. Pat. No. 4,678,208 to provide a gasket segment which is of greater circumferential length than the circumferential length of the coupling segment in which it is to be received, such that the adjacent ends of a pair of such gasket segments engage each other prior to final tightening down of the pipe coupling, and exert both circumferential and radially inward compressive stresses on the gasket segments at their ends to force them into intimate sealing engagement with the outer periphery of the associated pipe as the segmented pipe coupling is tightened down. De Raymond teaches the provision of abutments at the respective ends of the gasket segments to limit movements of the gasket segments to the end thereof under compressive loading.

This, however, entails sliding frictional movement of the ends of the gasket segments relative to the pipe exteriors when the coupling segments are applied to the pipe, and in turn carries with it the requirement that a lubricant be applied to the inner circumferential face of the respective gaskets prior to the assembly of the segmented pipe coupling onto the pipe.

The lubricant is required in order to minimize scuffing and abrasion of the gasket segments as they are applied to the pipe and during tightening down of the coupling, and also, to facilitate movements and displacements within the body of the gasket segments as required to ensure correct seating and fluid tightness of the gaskets, particularly at the opposite ends thereof.

Scuffing or abrasion of the gasket segments can result in the formation of crumbs abraded from the gasket material, and which interfere with the proper seating of the gasket segments in fluid fight relation with the juxtaposed outer surface of the associated pipe.

This requirement to lubricate the gasket segments is inconvenient, in that it must be done immediately prior to assembly of the segmented pipe coupling onto the pipes, which itself is possibly being assembled onto pipes positioned in highly inconvenient locations.

SUMMARY OF THE INVENTION

It is an object of this invention to avoid the inconvenience of lubricating the gasket segments prior to assembly onto pipes, by providing what can be termed as a dry or lubricant-free gasket that can be satisfactorily assembled onto a pipe in the total absence of any applied lubricants.

This is accomplished according to the present invention by providing a gasket of greater circumferential length than that of a segmented coupling or coupling segment in which it is to be received, such that ends of the gasket or gasket segments engage each other in compressive relationship prior to final tightening down of the coupling onto a pipe.

In order to eliminate the requirement for lubrication, reliefs are provided on the inner circumference of the gasket or gasket segments at each of the ends thereof which permit ready movement of the ends of the gasket or gasket segments relative to the pipe prior to and during tightening down of the coupling, in a substantially friction free manner.

The reliefs are of such an extent that the ends of the gasket or gasket segments are free to move relative to the pipe exterior in the substantial absence of frictional restraint during the initial assembly of the coupling onto the pipes, the forces generated during tightening down of the coupling then resulting in compressive forces which act to compressively distort the ends of the gasket or gasket segments in a radially inward direction and into the required sealing relationship with the pipe exterior, to the substantial exclusion of any sliding movement of the ends of the gasket or gasket segments relative to the outer periphery of the pipe.

Preferably, the reliefs are of such an extent that they readily will permit the ends of the gasket or gasket segment to move relative to a pipe of maximum dimensions within the permitted range of tolerances of pipes of a particular nominal diameter, thus again further reducing the possibility of scuffing or abrasion of the inner circumference of the gasket at the ends thereof.

DESCRIPTION OF THE DRAWINGS

The invention will now be described with reference to the accompanying drawings, which illustrate a preferred embodiment of the invention, and, in which:

FIG. 1 is a fragmentary perspective view illustrating one end of a prior art gasket segment, as is disclosed in De Raymond U.S. Pat. No. 4,678,208;

FIG. 2 is a transverse cross-section through a coupling segment, and showing partially in cross-section, a gasket segment according to the present invention;

DISCUSSION OF THE PRIOR ART EMBODIMENT

Figure 3:
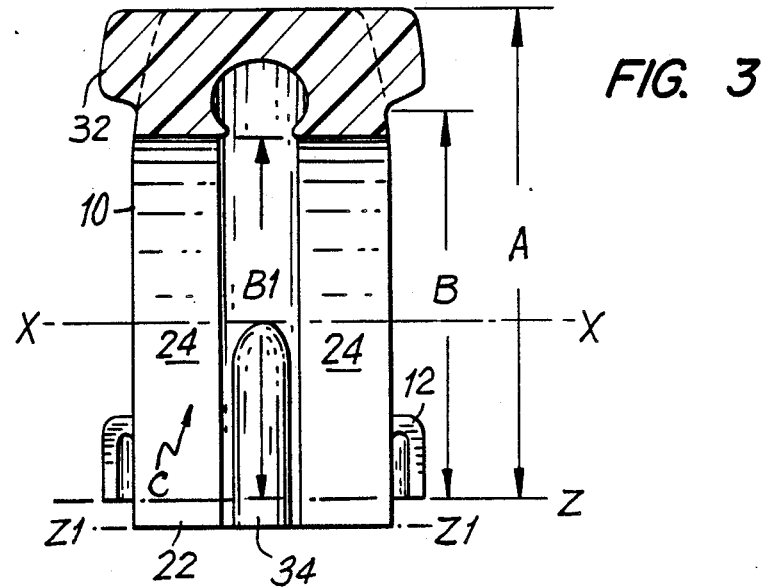
FIG. 3 is a transverse cross-section of the gasket segment of FIG. 2, and taken on the line Y—Y of FIG. 2.

While not limited thereto, the gasket segment of the present invention conveniently is of a shape somewhat similar to that disclosed in De Raymond U.S. Pat. No. 4,678,208, the specific configuration of the end of the gasket segment taught by De Raymond being shown in FIG. 1 of the accompanying drawings.

In FIG. 1, the body of the gasket segment, which is generally indicated at 10, is provided at its opposite ends with a skirt portion 12. The skirt portion 12 is comprised of an outwardly extending flange portion 16 B, which continues into a skirt portion 18 comprised of an outer wall 18A and side walls 18B, each of which are spaced from the body of the gasket 10, and which provide a channel 20 surrounding the end face 22.

The body of the gasket segment is provided with inwardly extending sealing lips 24, as is conventional in the gasket art.

Again as is conventional in the art, the gasket segment 10 of FIG. 1 is to be received within a coupling segment cast from ductile iron, such as the coupling segment 30 illustrated in FIG. 2.

Returning again to FIG. 1, it will be seen that the sealing lips 24 commenced at their axially outer edges in a diameter B, and progressively converge radially inwardly to their free edges, and terminate in a radius B1 which is less than the radius B. The radius B is arranged to be slightly less than the radius of a pipe to which the gasket segment is to be applied, as a consequence of which the radius B1 of the free edges of the sealing lips 24 is considerably less than the radius of the outer surface of the pipe.

This requires that the gasket segment 10 be forced over the outer surface of the pipe the outer surface of the pipe being rough and without surface finishing.

Thus, when the gasket housed in its associated coupling segment is forced over the external surface of a pipe, the ends of the gasket segment, in particular, are subjected to radially outward displacement, resulting in compression of the gasket segment at its ends, and in turn, resulting in greatly increased frictional engagement of the ends to the gasket with the pipe exterior. This effect progressively diminishes towards the center of the gasket, the center of the gasket moving on a true radius of the pipe, such as the axis Y—Y in FIG. 2. However, the ends of the gasket are moving tangential to the pipe exterior, and perpendicularly or transverse to the diameter of the pipe lying perpendicular to the Y—Y axis.

Such movement of the gasket segment ends tangential to the rough and unfinished pipe exterior can result in scuffing and abrasion of the gasket material. If such scuffing or abrasion occurs, this can result in crumbs of the gasket material being abraded from the gasket segment, the crumbs of gasket material being entrapped between the juxtaposed faces of the sealing lips 24 and the outer surface of the pipe. Such crumbs of gasket material prevent the sealing lips from intimately seating on the pipe exterior, and, can result in seepage or leakage paths in directions axially of the pipe.

For this reason, it has been the invariable practice to lubricate the gasket segment immediately prior to it being assembled onto a pipe. However, the operation of lubricating the gasket must be done manually and immediately prior to the assembly of the gasket segment onto the pipe. This represents a great inconvenience, particularly when the pipe is positioned in a relatively inaccessible location, the requirement being that the workman hold the coupling segment into which a gasket segment has been inserted with one hand, and then using his other hand to swab or brush, or otherwise apply the lubricant to the inner face of the gasket segment, and, then perform the same operation on at least one more coupling segment and its incorporated gasket segment, prior to the coupling segments and thus the gasket segments being applied over the pipe exterior. Clearly, it would be of great advantage if the requirement to lubricate the gasket segments could be dispensed with.

As has been discussed above, conventional gasket segments are formed throughout their circumferential length with a radially inner surface commencing at the outer edges of the gasket segment in a radius B which is slightly smaller than the radius of the outer surface of the pipe to which the gasket segment is to be applied. Further, the sealing lips of conventional gasket segments progressively decrease in radius from the radius B to a radius B1 at the free edges of the sealing lips.

De Raymond U.S. Pat. No. 4,678,208 teaches a gasket segment which is of greater circumferential length than the gasket segment into which it is incorporated, or, expressed another way, which is of a circumferential length greater than one half of the circumferential length of the pipe to which it is to be applied. This is done intentionally in De Raymond in order to provide the desired effect of compressive distortion and compaction of the ends of the gasket segments as the coupling segments are tightened down, causing the ends of the coupling segments to bulge outwardly into engagement with the associated coupling segment and into compressive relation with the opposed end of the next adjacent coupling segment, in order to accomplish a fluid-tight seal between the opposed ends of the respective gasket segments.

The present invention takes advantage of this underlying concept, and employs it in order to provide the dry or lubrication-free gasket of the present invention.

DISCUSSION OF THE INVENTION CONCEPT

As opposed to the prior art constructions, instead of forming the sealing lips of the gasket segment of a radius less than B, the sealing lips at the ends only of the gasket segment are formed to a radius greater than B, i.e., as illustrated in FIG. 2 are formed of a radius C which is greater than either the radius B or the radius B1, and which, also is slightly greater than the radius of the outer surface of a pipe of maximum dimensions within the permitted range of manufacturing tolerances of such pipes for which the gasket segment is intended.

Provided that the radius C is larger than the radius of a pipe of maximum dimensions within the permitted range of manufacturing tolerances of such pipes, then, the ends of the gasket segment can move freely over the exterior surface of the pipe in the substantial absence of any frictional engagement with the exterior surface of the pipe. This, in turn, eliminates scuffing at the ends of the gasket, which are at that time moving tangential to the pipe exterior, and in turn eliminates the formation of crumbs.

Further, that portion of the sealing lips that lies between the end portions, i.e., between the lines X-X, extends parallel to the pipe axis instead of converging towards the pipe axis, and is less in radius than the radius of the outer surface of a pipe of minimum dimensions within the permitted range of manufacturing tolerances of such pipes. In this manner it is ensured that the sealing lips are moved into sealing engagement with the pipes in a compressive movement and in the almost total absence of any sliding movement relative to the pipe exterior.

DESCRIPTION OF THE PREFERRED EMBODIMENT

Referring now to FIGS. 2 and 3, it will be seen that the gasket segment is of a outer radius A, other than at its opposite ends.

It will also be seen that throughout a major segment of the gasket segment lying arcuately between the planes X—X, the gasket segment has end faces which terminate in a radially inner edge B, again of constant radius throughout that arcuate extent. Also, the sealing lips of the gasket, throughout that arcuate extent, are of a radius B1, not only at their free edges, but also throughout the entire axial extent thereof.

Thus, when the gasket segment is applied over a pipe, the intermediate portion of the gasket segment moves into contact with the pipe in a direction perpendicular thereto, and in the absence of frictional sliding engagement therewith. This is contrasted with the movement of the end portions of the gasket segment which are moving tangentially of the pipe exterior on opposite sides of a diameter of the pipe.

As will be observed in FIG. 2, each of the radii A, B and B1 have their point of generation located on a longitudinal axis Z.

The ends of the gasket segment are formed differently from the intermediate portion. The ends of the gasket segment lying between the lines X—X and the free ends thereof are of a radius C having its point of generation located on an axis Z1 which is displaced downwardly from the longitudinal axis Z. Additionally, the radius C is of greater radius than either the radius B or B1, such that the inner circumference of the gasket segment flares outwardly from the lines X—X towards the free ends thereof.

As has been previously explained the radius C is the same as or preferably slightly greater than the radius of the outer circumference of a pipe of maximum dimension within the permitted range of manufacturing tolerances of such pipes. Thus, the ends of the gasket segment are not subjected to compressive engagement with the pipe, but are free to move over the pipe in the substantial absence of frictional contact therewith, i.e., the ends of the gasket segment are freely movable onto the pipe in a manner not requiring pre-lubrication of the gasket segment.

Subsequent to the application of the gasket segment over the pipe, the ends of the gasket segment are compressed by their engagement with the end of a juxtaposed gasket segment, this causing contraction of the gasket segment in circumferential length, and also resulting in outward radial bulging and inward radial bulging of the ends of the gasket segments. As outward bulging of the ends of the gasket segments is constrained by the coupling segment, only a limited amount of radially outward bulging at the ends of the gasket segments will occur. The bulging at the ends of the gasket segments will be dominantly in a radially inward direction, such that the ends of the gasket segments progressively move radially inwardly of the pipe exterior and into intimate sealing relationship therewith, this movement of the ends of the gasket segments occurring in the absence of any frictional sliding movement.

Figure 4:
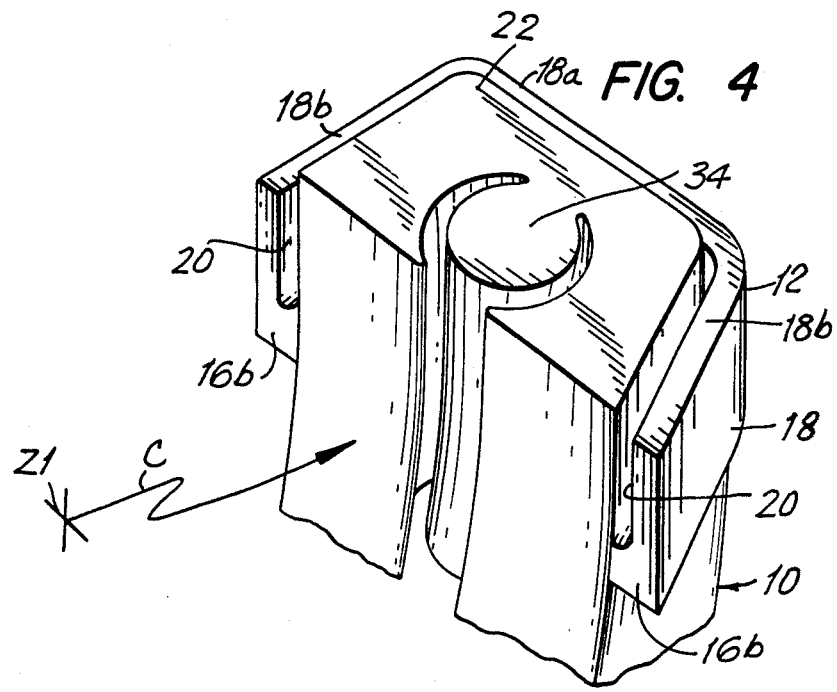
FIG. 4 is a fragmentary perspective view of one end of a gasket segment according to the present invention.

The construction of the gasket will now be more fully described with reference to FIGS. 3 and 4 of the drawings, portions in common with the prior art embodiment of FIG. 1 having been identified using the same reference numerals as those used in FIG. 1.

Referring now to FIG. 3, which shows a section taken on the line Y—Y of FIG. 2, it will be seen that the gasket segment 10 is provided with ears 32, which are to be received in corresponding recesses formed in the coupling segment 30.

The ears 32 are provided in order to ensure that the gasket segment is positioned within its coupling segment in correct angular relationship, thus ensuring that the free ends of the gasket segment extend from the coupling segment by identical extents. This is in order to eliminate any off-centering of the gasket segment such as would cause sliding movement of the gasket segment within the coupling segment due to relative angular displacement between those members.

As is illustrated in Figures 2 and 3, the outer diameter of the gasket segment is of a radius A taken from the longitudinal axis Z—Z.

The sealing lips 24, instead of diverging outwardly from their free edges towards the outer sides of the gasket segments, extend parallel to the Z—Z axis and are of a diameter B1 throughout their entire axial length. By forming the sealing lips in this manner, progressively increasing compression of the sealing lips is obtained from their free edges towards the outer side surfaces of the gasket segment, again militating against possible leakage or seepage axially of the pipe. The diameter B1 continues down to the line X—X, the reasons for so doing having been previously explained.

Below the line X—X, the sealing lips 24 are formed of a radius different from the radius B1, specifically, the radius C having its point of generation arranged on the axis Z—Z, which is displaced downwardly from the axis Z—Z by a distance C-B1.

Optionally, but not essentially, a baulster 34 is provided internally of the gasket segment and between the sealing lips 24, the baulster 34 extending perpendicular to the diameter Z—Z, and being substantially axially straight. The purpose of the baulster 34 is to provide a compressible filler member, which has for its purpose to further promote inward bulging of the ends of the gasket segments at the time those ends are subjected to compression.

Figure 5:
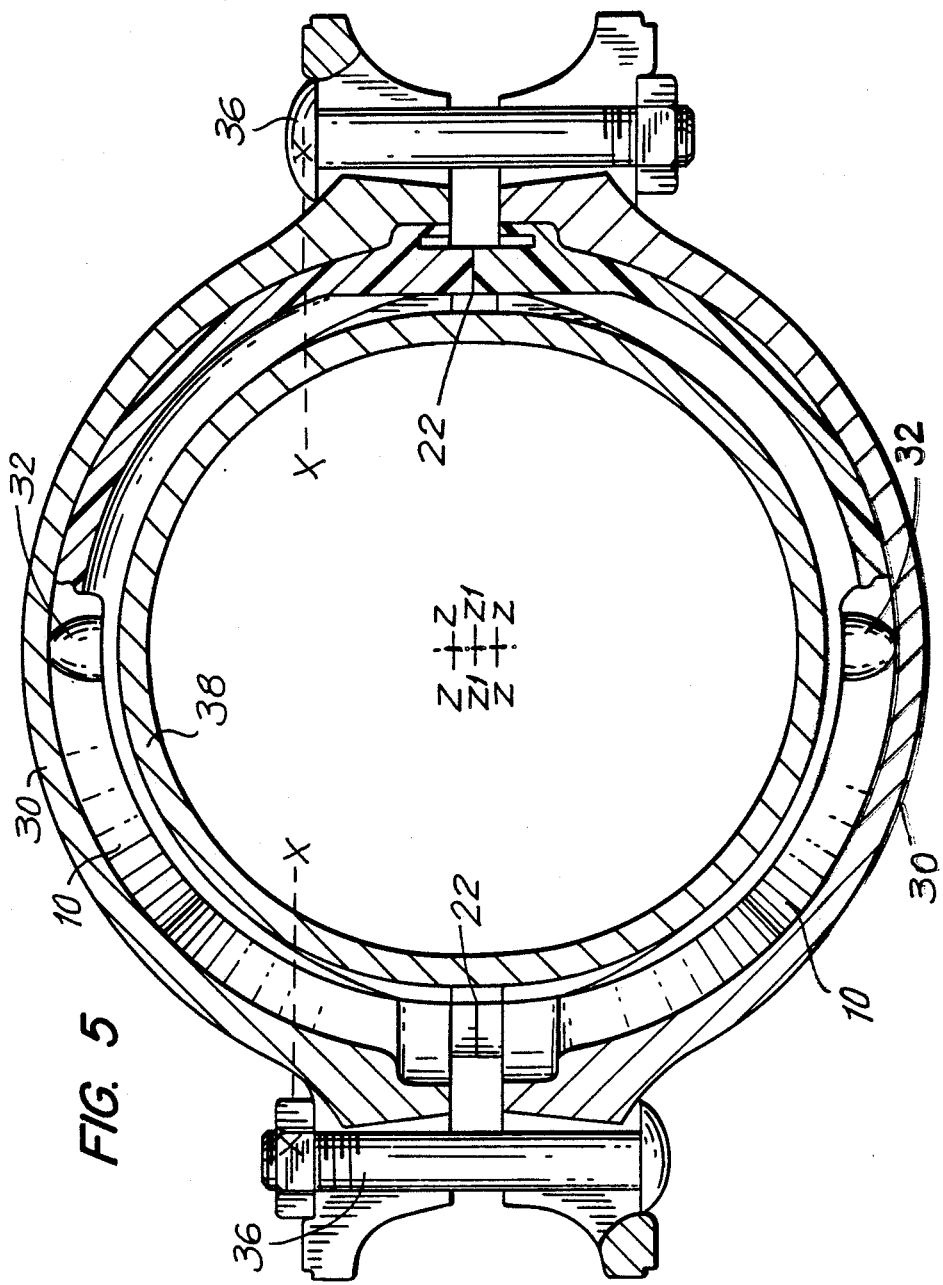
FIG. 5 is a view similar to FIG. 2, but showing two coupling segments, each incorporating a gasket segment according to the present invention, as assembled prior to tightening down of the traction bolts.

Referring now to FIG. 5, a pair of identical coupling segments 30 each incorporating a gasket segment 10 of the invention are shown assembled to each other by traction bolts 36, which initially will be applied finger-tight such that the end faces 22 of the respective gasket segments are in touching, but not necessarily in compressive engagement with each other.

At this time, the end faces 22 of the respective gasket segments each lie on a common diameter Z1—Z1, the end faces of the respective coupling segments each lying on a diameter Z—Z.

In this condition, and as has been shown in exaggerated form in FIG. 5, the arcuate portion of the gasket segment lying between the lines X—X has reached a position in which it is resting on the outer surface of the pipe 38, the ends of the respective gasket segments being spaced from the outer circumference of the pipe 38. This spacing is, of course, arranged to be of the smallest possible extent commensurate with the ability of the ends of the gasket segments to move relative to the pipe exterior in the substantial absence of any frictional engagement therewith.

Figure 6:
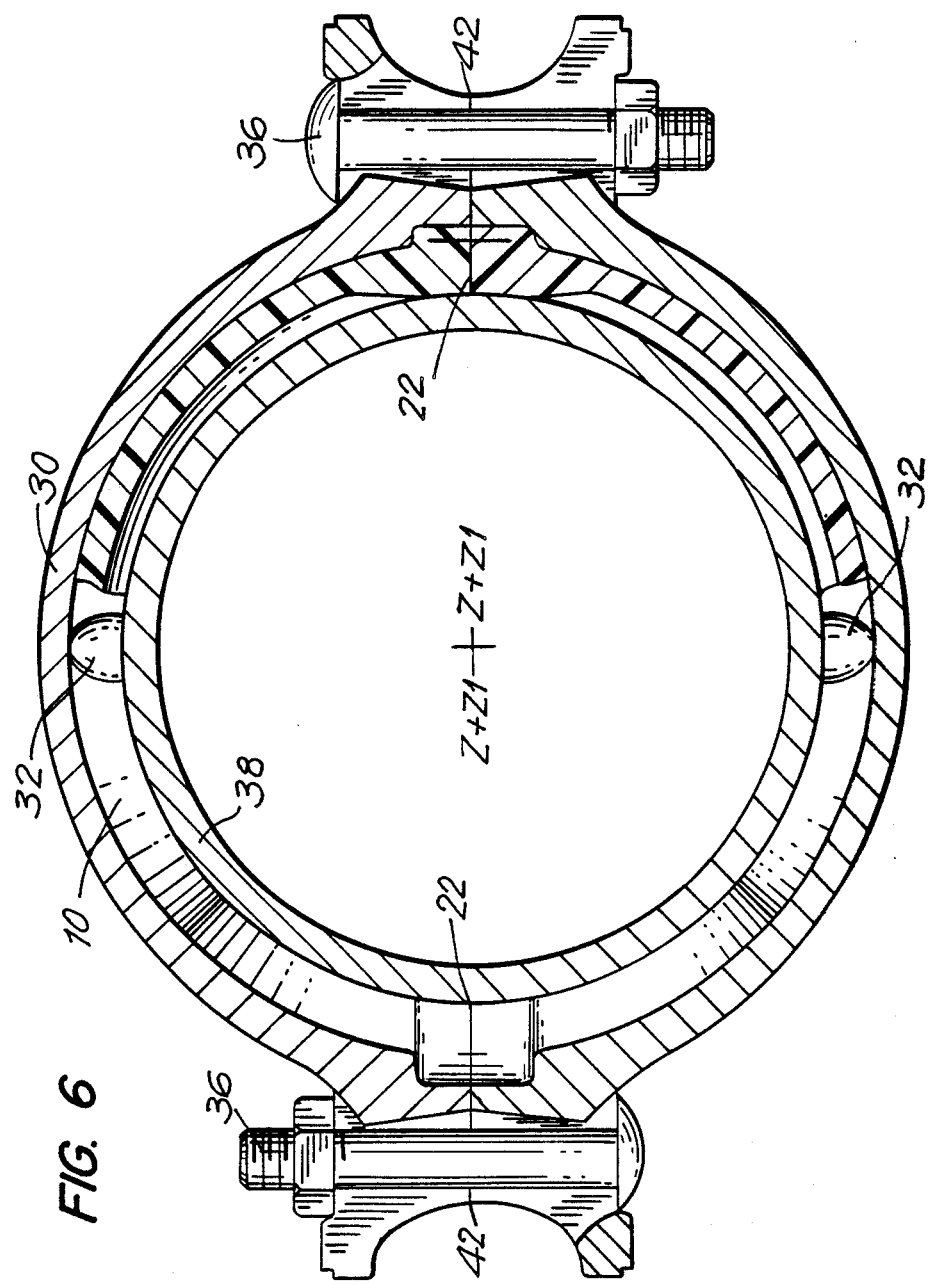
FIG. 6 is a view corresponding with FIG. 5, and which shows the conditions obtained after final tightening down of the traction bolts; and, FIG. 7 is a fragmentary perspective view of one end of a coupling incorporating the gasket segment of the present invention, and which is shown in the approximate conformation it assumes upon final tightening down of the traction bolts.

Referring now to FIG. 6, when the traction bolts 36 are torqued down, the diameters Z—Z and Z—Z progressively move towards each other, and, into coincidence with the diameter Z1—Z1. This results in compression of the respective ends of the respective gasket segments. Because the material from which the gasket segment is formed is essentially incompressible, and also, because as the ends of the gasket segment are confined by the coupling segment against any appreciable outward bulging, the progressively developing compressive force is dominantly resolved in the ends of the coupling segments as a radially inwardly acting force causing the ends of the coupling segments to bulge radially inwardly into intimate sealing contact with the outer circumference of the pipe, this movement being in In this condition, and as has been shown in exaggerated form in FIG. 5, the arcuate portion of the gasket segment lying between the lines X—X has reached a position in which it is resting on the outer surface of the pipe 38, the ends of the respective gasket segments being spaced from the outer circumference of the pipe 38. This spacing is, of course, arranged to be of the smallest possible extent commensurate with the ability of the ends of the gasket segments to move relative to he pipe exterior in the substantial absence of any frictional engagement therewith.

Referring now to FIG. 6, when the traction bolts 36 are torqued down, the diameters Z—Z and Z—Z progressively move towards each other, and, into coincidence incidence with the diameter Z1—Z1. This results in compression of the respective ends of the respective gasket segments. Because the material from which the gasket segment is formed is essentially incompressible, and also, because as the ends of the gasket segment are confined by the coupling segment against any appreciable outward bulging, the progressively developing compressive force is dominantly resolved in the ends of the coupling segments as a radially inwardly acting force causing the ends of the coupling segments to bulge radially inwardly into intimate sealing contact with the outer circumference of the pipe, this movement being in directions perpendicular to tangents of the pipe exterior, and essentially in directions truly radial to the pipe.

Such compression of the ends of gasket will continue until either the keys 40 of the coupling segments have bottomed down onto the pipe, or, until end faces 42 (FIG. 2) of the coupling segments have reached face engagement with each other, as illustrated in FIG. 6.

Figure 7:
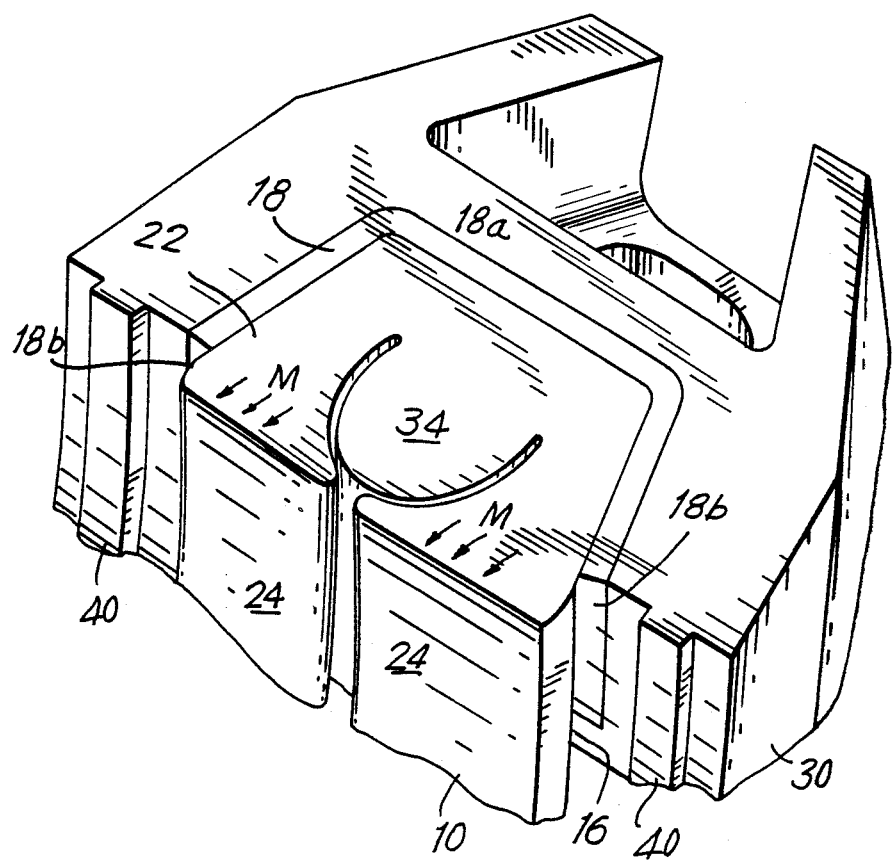

FIG. 7 is illustrative of the conditions which will have resulted in the ends of the gasket segment 10 at the time final tightening down of the coupling segments has been effected. By virtue of the compression of the gasket ends, the end face 22 will have moved downwardly in FIG. 7, this resulting in outward displacement of the end of the gasket segment into sealing relation with the skirt 18. As the skirt 18 itself is essentially incompressible, any further compression of the gasket end will result in movement of the sealing lips towards the baulster 34, the baulster 34 itself increasing in dimensions in the plane of the end face 22 by virtue of the compression thereof, and, additionally, movement of the body of the sealing lips 24 in a direction radially inwardly of the axis of the pipe 38, as illustrated by the arrows M.

These movements of the body of the gasket material at the ends of the gasket segments are in a direction radially inwardly of the pipe, and which progress from the smallest distance of the ends of the gasket segment from the pipe exterior and in the absence of any sliding movement, and then sequentially progresses to the ends of the gasket segments in the total absence of any sliding movement of the gasket material relative to the external circumference of the pipe. This is due to the fact that the material of the gasket is essentially incompressible, this in turn resulting in progressive compression of the end of the gasket segment commencing at the point in actual physical contact with the pipe exterior, the compressive force at that time then being transferred to the next immediately adjacent section of the gasket segment, progressively and sequentially up to the end face 22.

As has been previously stated, while the baulster 34 is preferable, it is not absolutely essential to the inventive concept of the present invention. In the absence of the baulster 34, the same movements of the sealing lips 24 at the ends of the gasket segments will occur. The baulster 34, more particularly, has the desirable effect of increasing the compressive forces exerted between the respective end faces 22 of the adjacent gasket segments. Also, while preferable, it is not absolutely essential that the ends of the gasket segments be provided with skirts. Any other form of holding members can be utilized, such as solid enlargements of the ends of the gasket segments, or, the ds of the gasket segments could be formed in an entirely conventional manner, i.e., without any such end enlargements. The end enlargements are provided more particularly to limit the extent of any circumferential sliding movement of the gasket segment within its associated coupling segment. Further, as will be appreciated, there is no requirement to provide sealing lips 24 at the ends of the gasket segments, other than for convenience in the manufacture of the gasket segments.

As described above, the gasket segments are 180° in arcuate extent. Equally well, they could be 360° in arcuate extent for them to provide a split gasket to be received over a pipe and the respective gasket ends then brought into abutment, subsequent to which a hinged segmented pipe coupling is applied over the gasket and then torqued down. By forming the gasket in the manner previously discussed, the need for pre-lubrication of the gasket also is eliminated, in that sliding movement of the gasket relative to the pipe exterior is eliminated.

I claim:

1. In an elastomeric gasket for incorporation into a segmented pipe coupling comprised of arcuate coupling segments, said elastomeric gasket being of an arcuate length greater than the arcuate length of a said arcuate coupling segment and having at least one sealing lip extending in a generally axially direction on a radially inner surface thereof, the improvement comprising:

a first portion of said sealing lip of a first radius intermediate the ends of said gasket; and, second portions of said sealing lip extending between the ends of said first portion and the respective ends of said gasket, each said second portion being of a radius greater than said first portion, and, at least equal in radius to the external radius of a pipe for which the segmented pipe coupling is intended;

whereby said elastomeric gasket can be positioned over a said intended pipe in the substantial absence of frictional engagement with said pipe.

2. The elastomeric gasket of claim 1, in which said gasket is a split gasket adapted to completely encircle a said intended pipe.

3. The elastomeric gasket of claim 1, in which said gasket is a gasket segment to be used in conjunction with at least one identical gasket segment in a segmented pipe coupling.

4. The elastomeric gasket of claim 1, in which said second radius is displaced from the center of generation of said first radius by a distance which is the difference between said first and second radii 5. The elastomeric gasket of claim 1, including an enlarged portion at each end of said gasket for reception in a socket recess in an associated end of a said coupling segment, said enlarged portion providing an abutment for limiting circumferential compression of said gasket to the respective ends of said gasket.

6. The elastomeric gasket of claim 1, including an enlargement of said gasket at the central portion thereof and extending axially thereof for positioning the respective ends of said gasket relative to the ends of a said coupling segment.

7. The elastomeric gasket of claim 1, in which said gasket is of an arcuate length greater than one half of the circumference of a said intended pipe.

8. The elastomeric gasket of claim 1, including dual sealing lips on said elastomeric gasket, said sealing lips having mutually presented free edges, and a filler member formed integrally with said gasket at the ends thereof and positioned between said sealing lips.

9. The elastomeric gasket of claim 1, in which compression of the ends of said gasket, when confined in a said coupling segment, is operative to cause radially inward bulging of said gasket at said ends, and into compressive sealing relation with a said intended pipe.

10. In combination, plural arcuate coupling segments each incorporating an elastomeric gasket according to claim 1, and traction means for urging juxtaposed ends of said coupling segments and said gasket towards each other whereby to produce compression of said ends of said gasket and inward bulging thereof to a radius at least equal to said first radius.

11. In an elastomeric gasket segment for incorporation into a segmented pipe coupling comprised of arcuate coupling segments, said elastomeric gasket segment being of greater arcuate extent than the arcuate extent of a said coupling segment, and having at least one sealing lip extending in a generally axial direction on a radially inner surface thereof, the improvement comprising:

a first portion of said sealing lip of a first radius intermediate the ends of said gasket segment; and, second portions of said sealing lip extending between the ends of said first portion and the respective ends of said gasket segment, each said second portion being of a radius greater than said first radius, and at least equal in radius to the external radius of a pipe for which the segmented pipe coupling is intended;

whereby said elastomeric gasket segment can be positioned over a said intended pipe in the substantial absence of frictional engagement with said pipe.

12. The elastomeric gasket segment of claim 11, in which said second radius is displaced downwardly from the center of generation of said first radius by a distance which is the difference between said first an second radii.

13. The elastomeric gasket segment of claim 11, including an enlarged portion at each end of said gasket segment for reception in a socket recess in an associated end of a said coupling segment, said enlarged portion providing an abutment for limiting circumferential compression of said gasket to the respective ends of said gasket.

14. The elastomeric gasket segment of claim 11, including an enlargement of said gasket extending axially of a central portion thereof for positioning the ends of said gasket segment relative to the ends of a said coupling segment.

15. The gasket segment of claim 11, in which said gasket segment is of an arcuate length greater than one half of the circumference of a said intended pipe.

16. The gasket segment of claim 11, including dual sealing lips on said gasket segment, said sealing lips having mutually presented free edges, and a filler member formed integrally with said gasket segment at the respective ends thereof and positioned between said sealing lips.

17. The gasket segment of claim 11, in which compression of the ends of said gasket segment, when confined in a said coupling segment is operative to cause radially inward bulging of said gasket at said ends and into compressive sealing relation with a said intended pipe.

18. In combination, dual arcuate coupling segment each incorporating an elastomeric gasket segment of claim 11, and traction means for urging juxtaposed ends of said coupling segments and said gasket segments towards each other, whereby to produce compression of said ends of said gasket segments and inward bulging thereof to a radius at least equal to said first radius.

19. A segmented pipe coupling comprised of plural arcuate coupling segments, traction means for moving said arcuate coupling segments into clamping engagement with a pipe end, and at least one elastomeric gasket positioned within said coupling segments and for sealing engagement with the exterior surface of a pipe of an external diameter for which said segmented pipe coupling is intended, characterized by:

a sealing lip having first portion of a first radius intermediate the ends of said gasket; and, second portions of said sealing lip extending between the ends of said first portion and the respective ends of said gasket, each said second portion being of a radius greater than said first radius, and, at least equal in radius to the external radius of a pipe for which the segmented pipe coupling is intended;

whereby said segmented pipe coupling can be installed over an intended pipe in the substantial absence of frictional engagement of the ends of said elastomeric gasket with said pipe.

20. The segmented pipe coupling of claim 19, in which said elastomeric gasket is a split gasket.

21. The segmented pipe coupling of claim 19, in which said elastomeric gasket is comprised of plural gasket segments equal in number to the number of coupling segments, each said coupling segment being of an arcuate dimension greater than the arcuate dimension of the associated said coupling segment, whereby, the ends of said gasket segments extend beyond end faces of the respective said coupling segments prior to tightening down of said coupling onto the exterior surface of a pipe.

* * * * *